April 18, 1967  F. H. GONZALEZ ET AL  3,314,516
CARRIAGE POSITION INDICATOR EMPLOYING FLEXIBLE TAPE
Filed July 9, 1965  2 Sheets-Sheet 1

INVENTORS.
FRANK H. GONZALEZ.
BYRON A. RUNDE.

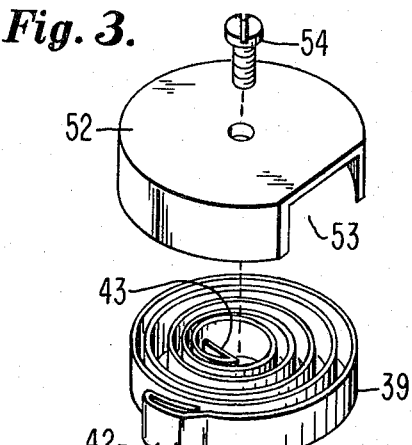
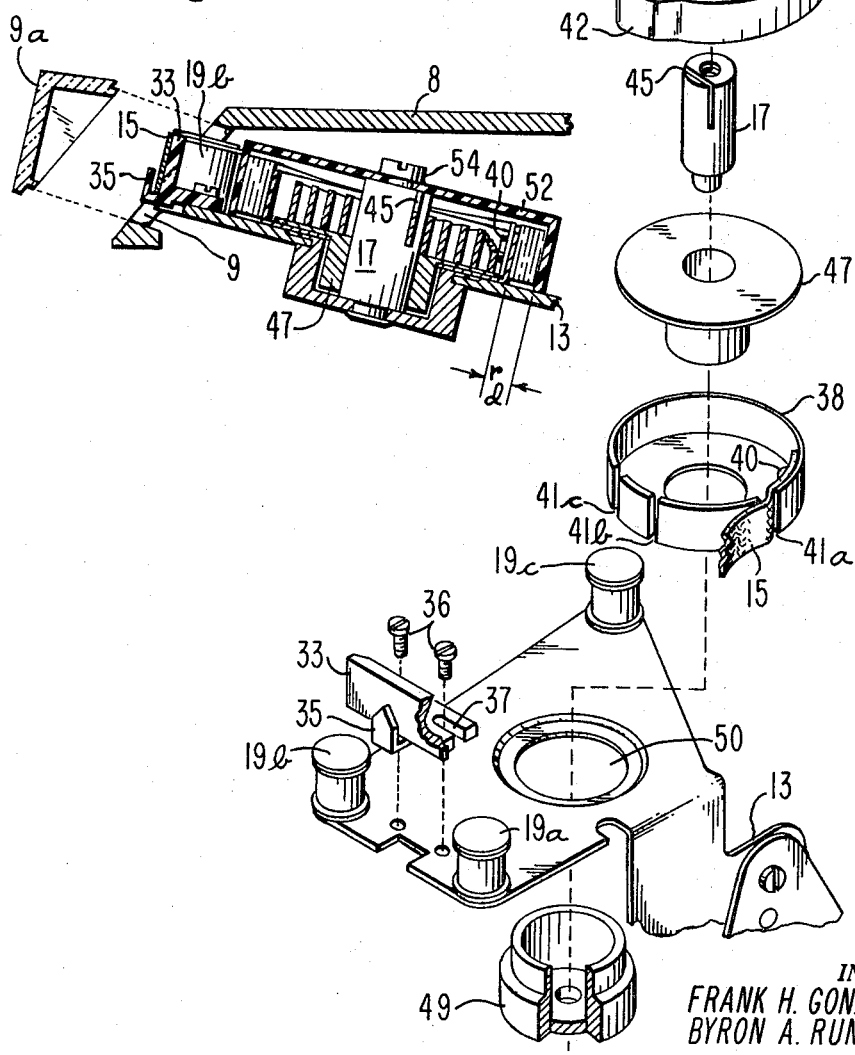

United States Patent Office 3,314,516
Patented Apr. 18, 1967

3,314,516
CARRIAGE POSITION INDICATOR EMPLOYING
FLEXIBLE TAPE
Frank H. Gonzales, Detroit, and Byron A. Runde, Farmington, Mich., assignors to Burroughs Corporation, Detroit, Mich., a corporation of Michigan
Filed July 9, 1965, Ser. No. 470,730
3 Claims. (Cl. 197—188)

This invention relates to an indexing or indicating mechanism for a reciprocating member, and, more particularly, to an improved indexing device automatically positioned in response to the movement of the member.

The invention will be described in connection with the carriage of business machines of the type shown in U.S. Patent No. 2,629,549 to Butler and U.S. Patent No. 2,881,895 to Gavasso, both of common ownership with the assignee of this application. The machine of the latter patent is a combined typewriter-accounting machine providing $\frac{1}{10}$ inch letter space escapements of its movable carriage, which utilizes the pin programming function control techniques employed in the Burroughs Sensimatic machine as described in the aforementioned Butler patent. The carriage of the combined typewriter-accounting machine thus has ten different stop positions per inch in various ones of which a plurality of various automatic operations of the machine may be effected by a set of control pins provided for that particular position. A 24-inch carriage machine equipped with a $\frac{1}{10}$ inch tabulating escapement thus has 240 different carriage positions in which such sets of control pins could be provided.

Occasionally a machine will develop a malfunction in one of its aforementioned stop positions. In order to rapidly repair the machine, it is most useful to be able to determine rapidly and accurately any and, if so, which set of program pins may be causing the machine malfunction by pinpointing the precise location of the carriage and thus the precise set of program pins involved in the malfunction. Any mensuration indexing or indicating device used for this purpose must, of course, be very accurate and easily read by the serviceman.

The basic Butler accounting machine is also capable of performing four separate work or program schedules by enabling any one of four different sets of control pins to be effective in a carriage stop position thereof. In operating the Butler machine, the operator must perform a specific function at selected positions of the carriage, and this function may be different for the same carriage position of each of the four programs. It has been found very helpful in training an operator to have an easily read carriage indexing or position indicating device utilizing a coded symbol for each carriage position, which symbol would inform the operator of the operation to be performed at that carriage position. Such an indexing device could be used both to jog the operator's memory and for instructional use. However, since the machine is carriage controlled for different programs, the coded indexing device should preferably be interchangeable.

Prior forms of carriage position indicating or indexing devices have been merely a legend carrying strip or graduated scale permanently emplaced on the carriage of the machine with a pointer affixed to the body of the machine. Such devices were located rearwardly of the machine keyboard and printing section and were obscured and/or contacted by such parts of the machine rendering the scale difficult to read owing, inter alia, to distance, parallax and wear considerations. Such machines have also employed mensuration devices in the form of a spring biased take-up reel in combination with a guided indicia bearing tape and a stationary pointer. The take-up reel was driven in response to the actuation of the keys or other parts of the machine, necessitating the use of additional mechanical drive means to drive the take-up reel and causing undue wear of the tape. Another objectionable factor was that the indicia bearing face of the tape was in contact with the tape guide elements causing erosion of the indicia on the tape.

It is therefore the principal object of this invention to provide a practical and accurate carriage position indicating, indexing or mensuration device for an accounting machine.

It is another object of this invention to provide a carriage position indexing mechanism easily read from the normal position of the operator.

It is a further object of this invention to lessen the wear on the indicia utilized on a carriage-indexing device.

It is a still further object of this invention to provide a carriage-indexing device having easily interchangeable coded indexing tapes.

Applicants have achieved the above listed and other desirable features by employing in a machine having a reciprocally movable member, such as a business machine carriage, a self-restoring tape spool removably mounted on the body of the machine forwardly from the line of movement of the reciprocating member with the free end of the tape adjustably and removably fastened to the reciprocating member. The exposed portion of the tape, which varies in length with movement of the member, is guided by rollers to provide a section conveniently located for operator reading, a backwardly extending section having a half-twist therein, and a section parallel to the line of movement of the reciprocating member. Due to the half-twist in the tape, the indicia-bearing face of the tape is always away from the tape guide rollers, which contact only the obverse face of the tape. A pointer is adjustably mounted in close proximity to the portion of the tape located forwardly on the machine for easy and precise operator reading.

The above-listed objects and other aspects of applicants' invention will be further explained in the following detailed description and illustrated in the accompanying drawings which disclose, by way of example, the preferred embodiment of applicants' invention. For a more complete understanding of applicants' invention, reference may be had to the accompanying drawings in which:

FIG. 3 is an exploded view of the spring-biased, indicia tape mechanism of FIG. 2; and FIG. 4 is a sectional elevation view taken in the plane 4—4 of FIG. 1.

Figure 1:
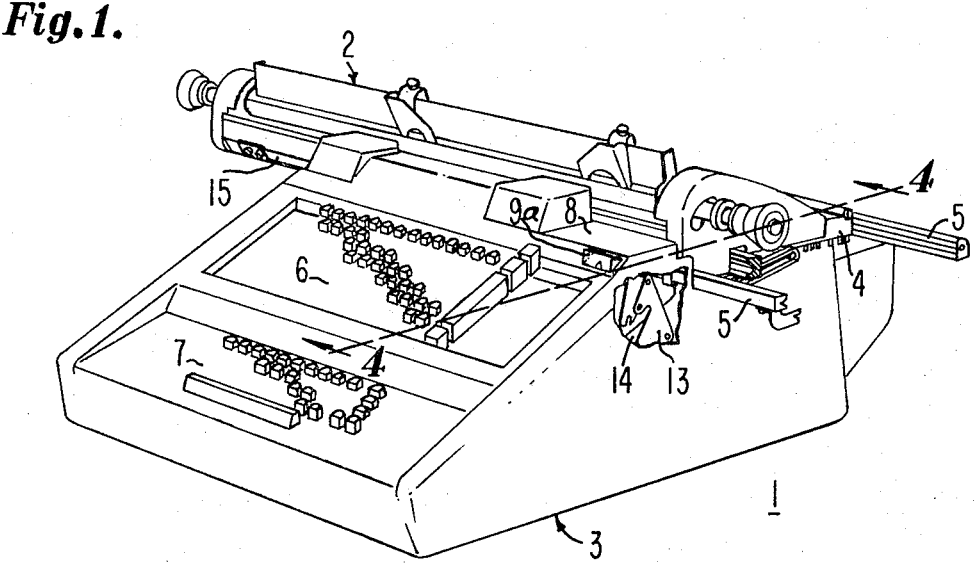
FIG. 1 is a perspective view with parts broken away of a business machine utilizing the carriage position indicating device of the present invention.

With reference to FIG. 1, there is depicted a business machine 1 of the aforementioned character having a carriage portion 2 movably mounted on a stationary base portion 3 on which the carriage with its platen and its pin carrying program panel 4 are supported between stationary guide rails designated by the numeral 5. The base portion further includes an upper keyboard section 6 for indexing of amounts and for controlling and initiating various accounting functions and operations of the machine and a lower typewriter keyboard section 7 located forwardly of the upper keyboard section. The printers controlled by the respective typewriter and the accounting machine sections are normally retracted as disclosed in the aforementioned patents and are housed below the raised turret 8 mounted on the base portion of the machine rearwardly of the accounting machine keyboard 6 thereof. On the right of the turret there is provided an elongated opening 9 in the turret or cover that receives a transparent snap-in window 9a therein through which is displayed in view of the operator a part of the indicating structure of the subject carriage position indicating device 10 of the present invention.

Figure 2:
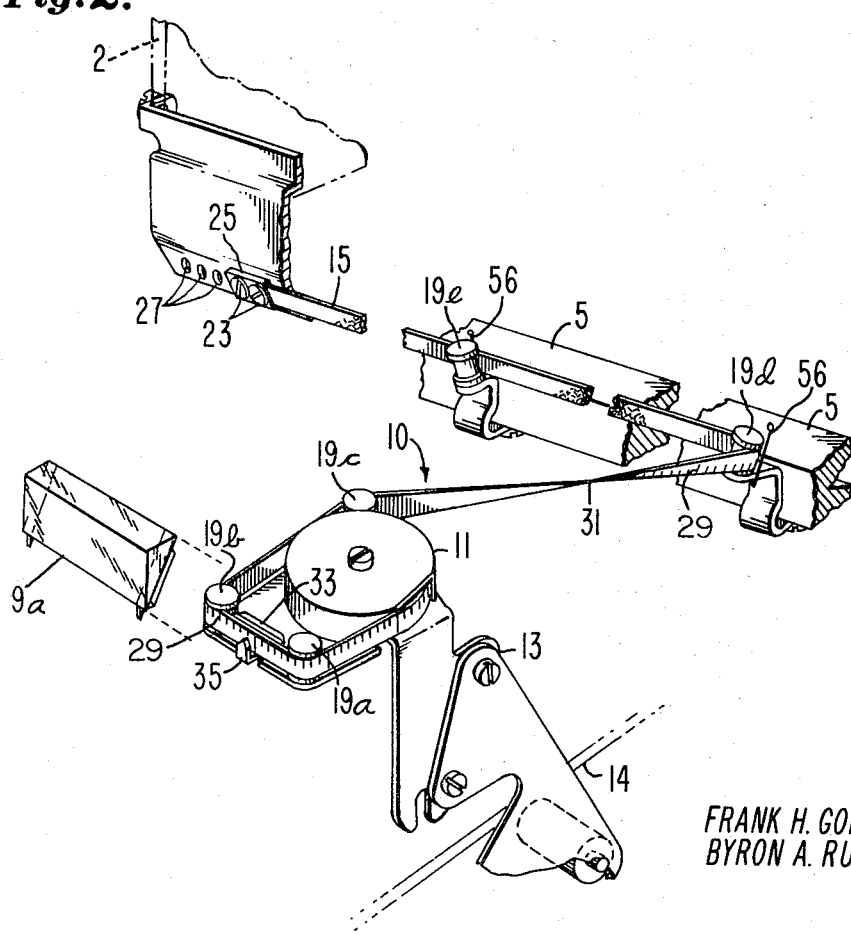
FIG. 2 is a perspective view of a carriage position indexing system embodying tthe principles of applicants' invention.

As shown in FIG. 2, the device includes a tape spool 11 which is removably mounted on a bracket assembly 13 that is rigidly attached to a side frame 14 of the stationary portion of the machine. The tape spool 11 includes a flexible, non-stretching tape 15 spring-wound on a fixed take-up shaft or spindle 17 (FIG. 3) for the paying out of the tape under tension and for the automatic restoration of the tape when the tension is removed. The tape 15 may be of metal, such as steel, but preferably is made of material less susceptible to expansion and contraction due to temperature variations. Many modern synthetic materials, such as Dacron, have these stable characteristics.

Tape guide rollers 19, mounted on the forward stationary support rail 5 and on the bracket assembly 13, determine the path of movement of the exposed portion of tape 15, the otherwise free end of the tape being attached to the reciprocating carriage 2 by any convenient means, such as screws 23. A clip 25 is securely fastened to the left or outer end of the tape 15 and has apertures therein for receiving the screws 23. A series of pre-threaded holes 27 is provided in carriage 2 for aligning tape 15 and for making gross adjustments in the length of the exposed portion of the tape, as to any given position of the reciprocating carriage.

The rollers 19 are positioned to provide three principal sections in the path of the exposed portion of the tape 15: a variable length section adjacent and parallel to the path of motion of the reciprocating carriage 2 and limited by the end of the tape secured to the carriage; a relatively short section substantially parallel to the first section but disposed forwardly on the machine from the variable length tape section and the spool 11; and an intermediate section extending rearwardly from the short section to the variable length section of the tape.

The tape 15 bears on one side thereof indicia, such as calibrations 29, for indexing the position of the carriage 2. The spool 11 is so positioned on the bracket 13 that the exposed end of the tape 15, as it emerges from the spool and crosses the short section of the path, has indicia on the side facing forwardly on the machine and passes over rollers 19a and 19b with the indicia bearing side of the tape facing outwardly from the rollers.

The intermediate section of the tape 15 extends from roller 19b to roller 19d. Between the rollers 19b and 19d, a half-twist 31 is provided in the tape so that the indicia bearing face of the tape will not be contacted by the roller 19d. From the roller 19d to the point of attachment to the carriage, i.e., in the variable length section of the tape, the indicia face rearwardly of the machine and toward the movable carriage 2.

A back-up plate 33 and pointer 35 integrally formed with the back-up plate are positioned intermediate rollers 19a and 19b guiding the aforementioned short forward section of the tape. As shown in FIG. 3, the pointer is adjustably fastened to the bracket 13, as by screws 36 received in open elongated slots 37 formed in a rearwardly extending portion of the back-up plate to permit slight sidewise adjustment of the plate and pointer for precise alignment with the calibrations 29 on the tape. As the pointer is positioned close to the path of the tape, no problems of parallax arise in reading the index on the tape which is guided between the pointer and the back-up plate. The back-up plate also serves as an autographic plate or stand providing a firm backing for writing or making symbolic notations on the tape by the operator, programmer or serviceman when the flat surfaced window 9a is removed from the opening 9 in the turret cover.

The tape is calibrated with the movable carriage in its extreme right position where the indicator pointer 35 will then be at or set to the zero index position of the tape. As the carriage moves leftwardly in letter spacing escapements or columnar tabulations, the tape is withdrawn from the spool under increasing spring tension with the variable length portion of the tape increasing in length and held taut adjacent the carriage whose position is automatically indicated by the pointer. With the structural arrangement shown herein in which the spool is positioned on the right hand side of the accounting machine, the tape moves in the same direction as the machine carriage, and, as the tape is withdrawn from the spool, there is displayed an increasing order of numerical indicia on a numerically graduated tape, thus rendering the tape easily and accurately readable from left to right in the normal manner. As the carriage moves in the return direction to the operator's right, the tension is lessened on the spring-wound tape and it is automatically restored to the spool.

As shown in FIG. 3, the self-restoring spool 11 includes a shell 38 and a coiled spring 39, which is received within the shell. The shell 38 is in the shape of a shallow cup or drum having several slots in its peripheral cylindrical surface about the exterior of which the tape is wrapped. The right hand or inner end of the tape may be thickened or have an eyelet 40 (FIG. 4) therein to entrap or hold the end of the tape between the walls of a narrow inlet slot 41a in the drum. The coiled spring 39 has a bent back portion 42 at its outer end which is received in the slots 41b, 41c in the shell 38. The spring 39 has a straight portion 43 at its inner end for insertion in a slot 45 in the aforementioned spindle 17, which passes through a one-piece retainer and bushing 47 that is received in and welded to the shell 38 with the hub-shaped portion of the bushing extending through the shell as shown in FIG. 4.

The spindle passes through the bushing retainer piece 47 and is staked at its reduced lower end to a cup-shaped element 49 whose upper end is received in an opening 50 in the spool-carrying portion of the bracket 13 and is rigidly secured, as by spinning, therein. The spindle thus is stationary and forms a pintle shaft or journal on and about which the shell 38 and retainer bushing are received and rotate as an assembly. The tape carrying shell assembly is pretensioned by withdrawing a portion of the tape to rotate the shell several turns about the spindle 17 and fastening the left or outer end of the tape to the carriage 2 when the latter is in its extreme right position.

A dust cover in the form of an opaque plastic cylindrical inverted shell 52 having an opening 53 in the cylindrical surface thereof is placed over the lower shell and tape assembly and is secured to the spindle 17 by a screw 54. The aforementioned window 9a also serves to prevent dust and dirt from entering the viewing area of the indicator and, as shown in FIGS. 3 and 4, is provided with projecting tangs and inwardly squeezable, flexible triangular sides for snap-in insertion and ready removal from the opening 9 in the turret cover.

In accordance with another structural feature of the spool assembly, the inner diameter of the cover 52 is greater than the outer diameter of the shell 38 in which the tape is wrapped and these diameters are so proportioned relative to each other as well as to the thickness and the length of the tape that, when the tape is detached from the carriage and is nearly completely retracted into the spool, the overall thickness of the coil of tape received on the inner shell 38 will be equal to the difference in radii, $r_a$, of the shells and be snuggably and frictionally received to take up or occupy the space between the shells, thereby to prevent the outer end of the tape from snapping back or being drawn completely into the spool which would necessitate disassembly of the spool structure.

Additional rollers such as rollers 19d and 19e may be positioned as desired for smooth tracking of the tape 15, and retainers, as 56, may be provided on the rollers for assuring proper tracking of the tape on the rollers which may be at different elevations as the rollers 19d and 19c.

It will be apparent to those skilled in the art that the bracket 13 may be located as convenient on the body of the machine utilizing a reciprocating member, as long as the indicia on the self-restoring tape always face outwardly from the rollers 19.

It has been found that applicants' precise and easily read indexing mechanism makes possible the use of the indicia-bearing tape for purposes not before contemplated. In the training of servicemen, the tape can be color-coded, or otherwise imprinted, to show that certain carriage controls should be at given carriage positions, and separate tapes can be provided for different machine programs. Similarly, new operators can be trained by using an indexing tape showing, preferably by a code sign, that a given operation is to be performed at a given carriage position. It is, therefore, advantageous for tape to be easily detached from the reciprocating carriage and for the tape spool 11 to be easily removed and replaced on the bracket 13.

Although applicants' invention has been described in the environment of a business machine with a movable carriage, it will be apparent to those skilled in the art that its principles are equally applicable for indexing the position of a reciprocating member in other kinds of machinery.

What is claimed is:

1. In a machine having a stationary portion and a member reciprocally movable on said stationary portion, the combination of a self-restoring tape spool utilizing tape having indicia on one of its sides, said tape having its free end external to said spool and fastened to said member,
    means for mounting said tape spool on said stationary portion,
    a reference pointer on said stationary portion, and
    a plurality of rollers for guiding said tape from said spool past said pointer to said member, said tape having a half-twist therein intermediate its ends for preventing the said indicia of said tape from contacting any of said rollers.

2. A carriage indexing device for a business machine with a reciprocably movable carriage and a body portion extending forwardly of the carriage comprising
    a self-restoring tape spool utilizing tape having indicia on only one of its sides, said tape having its free end external to said spool and fastened to said carriage,
    means for mounting said tape spool forwardly on the body portion of said business machine for facilitating the reading of said indicia by the operator,
    a reference pointer mounted on said body portion in close proximity to said tape, and
    a plurality of rollers positioned for guiding said tape past said pointer, from said pointer to a point immediately forward of said carriage, and parallel to the line of motion of said carriage,
    said tape having a half-twist intermediate said pointer and said carriage for preventing said indicia side of said tape from contacting any of said rollers.

3. The combination of claim 2 wherein said tape moves past said reference pointer in the same direction as said reciprocably movable carriage.

References Cited by the Examiner

UNITED STATES PATENTS

| | | | |
|---|---|---|---|
| 376,642 | 1/1888 | Dille | 33—138 X |
| 501,774 | 7/1893 | Dunnington | 33—138 X |
| 768,331 | 8/1904 | Kitzmiller | 197—188 X |
| 1,097,170 | 5/1914 | Coladant | 197—194 |
| 1,140,330 | 5/1915 | Merlin | 197—194 |
| 1,734,068 | 11/1929 | Ziola | 116—124.5 |
| 2,025,590 | 12/1935 | Jaenichen et al. | 177—38 |
| 2,112,928 | 4/1938 | Shulman et al. | 33—138 X |
| 2,747,625 | 5/1956 | Small | 33—138 X |

FOREIGN PATENTS 734,623   4/1943   Germany.

ROBERT E. PULFREY, *Primary Examiner.*

DAVID KLEIN, *Examiner.*

E. S. BURR, *Assistant Examiner.*